(12) United States Patent
Hamada et al.

(10) Patent No.: US 11,644,252 B2
(45) Date of Patent: May 9, 2023

(54) FLOW PATH STRUCTURE OF HEAT EXCHANGER, AND HEAT EXCHANGER

(71) Applicant: NGK INSULATORS, LTD., Nagoya (JP)

(72) Inventors: Takafumi Hamada, Nagoya (JP); Tatsuo Kawaguchi, Nagoya (JP); Takeshi Sakuma, Nagoya (JP); Yutaro Fumoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/815,449

(22) Filed: Mar. 11, 2020

(65) Prior Publication Data

US 2020/0309471 A1 Oct. 1, 2020

(30) Foreign Application Priority Data

Mar. 28, 2019 (JP) .............................. JP2019-064920
Jan. 14, 2020 (JP) .............................. JP2020-004003

(51) Int. Cl.
*F28F 1/42* (2006.01)
*F28D 7/00* (2006.01)

(52) U.S. Cl.
CPC ............ *F28F 1/426* (2013.01); *F28D 7/0008* (2013.01)

(58) Field of Classification Search
CPC .... F28D 7/0008; F28D 2021/008; F28D 7/10; F28D 7/103; F28D 7/106; F28D 21/0003;

(Continued)

(56) References Cited

U.S. PATENT DOCUMENTS 3,001,767 A * 9/1961 Straubing ................. F28F 9/24
165/154
3,339,260 A * 9/1967 Burne ..................... F28D 7/106
29/890.036

(Continued)

FOREIGN PATENT DOCUMENTS

CN     108071545 A     5/2018
JP     2009144606 A * 7/2009 ......... F28D 21/0003

(Continued)

OTHER PUBLICATIONS

JP-2009144606-A—Machine English translation (Year: 2009).*

(Continued)

*Primary Examiner* — Tavia Sullens
*Assistant Examiner* — Khaled Ahmed Ali Al Samiri
(74) *Attorney, Agent, or Firm* — Burr Patent Law, PLLC (57) ABSTRACT

A heat exchanger 100 includes: an inner cylinder 10 through which a first fluid can flow, the inner cylinder 10 being configured to be capable of housing a heat recovery member 40; an outer cylinder 20 disposed so as to be spaced on a radially outer side of the inner cylinder 10 such that a second fluid can flow between the outer cylinder 20 and the inner cylinder 10; and an intermediate cylinder 30 disposed between the inner cylinder 10 and the outer cylinder 20, the intermediate cylinder 30 partitioning a flow path for the second fluid into an inner flow path 31b and an outer flow path 31a. In the heat exchanger, the intermediate cylinder 30 includes communication holes 32 that are communicated in a radial direction, and the communication holes 32 are provided in an axial direction of the intermediate cylinder 30.

10 Claims, 7 Drawing Sheets (58) Field of Classification Search
CPC .. F28D 2020/0078; F01N 3/02; F01N 3/0205; F01N 3/0234; F01N 3/2889; F01N 2240/02; F28F 21/04; F28F 2240/00; F28F 2250/04; F28F 2250/06
See application file for complete search history.

(56) References Cited

U.S. PATENT DOCUMENTS

| | | | | |
|---|---|---|---|---|
| 4,729,428 A * | 3/1988 | Yasutake | ............... | F28D 9/0062 165/153 |
| 4,747,448 A * | 5/1988 | Beduz | ................ | F28F 13/187 165/133 |
| 4,852,642 A * | 8/1989 | Lee | ................ | F28F 13/125 165/109.1 |
| 4,964,459 A * | 10/1990 | Stenlund | ................ | F28D 7/106 123/41.33 |
| 5,732,769 A * | 3/1998 | Staffa | ................ | F28D 7/106 165/154 |
| 7,255,096 B2 * | 8/2007 | Craig | ................ | F02M 26/32 165/157 |
| 2005/0079110 A1* | 4/2005 | Jobson | ................ | F01N 3/2889 422/173 |
| 2005/0109493 A1* | 5/2005 | Wu | ................ | F28D 7/103 165/157 |
| 2006/0054381 A1* | 3/2006 | Takemoto | ............... | F28D 7/103 181/237 |
| 2006/0201661 A1* | 9/2006 | Sugihara | ................ | F02M 26/32 165/158 |
| 2008/0029655 A1* | 2/2008 | Mabuchi | ................ | F01N 5/02 248/58 |
| 2011/0168369 A1* | 7/2011 | Kim | ................ | F28D 7/106 165/154 |
| 2011/0302910 A1* | 12/2011 | Burgers | ................ | F28D 7/103 60/299 |
| 2012/0222845 A1* | 9/2012 | Kinder | ................ | F28F 13/12 165/154 |
| 2012/0247732 A1* | 10/2012 | Suzuki | ................ | F28F 21/04 165/104.14 |
| 2013/0000286 A1* | 1/2013 | Azuma | ................ | F01N 5/02 60/320 |
| 2013/0133855 A1* | 5/2013 | Kim | ................ | F28F 1/424 165/41 |
| 2013/0213620 A1* | 8/2013 | Miyazaki | ................ | F28F 21/04 165/154 |
| 2013/0248159 A1* | 9/2013 | Yoshida | ................ | C04B 35/565 165/154 |
| 2014/0020877 A1* | 1/2014 | Suzuki | ................ | F01N 3/2889 165/181 |
| 2014/0110095 A1* | 4/2014 | Chang | ................ | F28F 1/40 165/181 |
| 2015/0241132 A1* | 8/2015 | Yanachi | ................ | F25B 40/00 165/154 |
| 2016/0003550 A1* | 1/2016 | Tokuda | ................ | F28D 7/103 165/140 |
| 2016/0341489 A1* | 11/2016 | Ichiyanagi | ............... | F28D 7/005 |
| 2017/0122161 A1* | 5/2017 | Fukami | ................ | F01N 5/02 |
| 2017/0191401 A1* | 7/2017 | Ichiyanagi | ................ | F28D 7/10 |
| 2018/0066560 A1 | 3/2018 | Kawaguchi et al. | | |
| 2018/0128415 A1* | 5/2018 | Wakatsuki | ............ | F16L 59/065 |
| 2018/0142967 A1 | 5/2018 | Kawaguchi et al. | | |
| 2020/0309464 A1 | 10/2020 | Fumoto et al. | | |

FOREIGN PATENT DOCUMENTS

| | | |
|---|---|---|
| JP | 2012-037165 A1 | 2/2012 |
| JP | 2020-159652 A | 10/2020 |
| WO | 2016/185963 A1 | 11/2016 |

OTHER PUBLICATIONS

Chinese Office Action (Application No. 202010160472.9) dated Apr. 30, 2021 (with English translation).
German Office Action (with English translation), German Application No. 10 2020 203 721.3, dated Jan. 21, 2022 (12 pages).

* cited by examiner

FIG. 9

FLOW PATH STRUCTURE OF HEAT EXCHANGER, AND HEAT EXCHANGER

FIELD OF THE INVENTION

The present invention relates to a flow path structure of a heat exchanger, and a heat exchanger.

BACKGROUND OF THE INVENTION

Recently, there is a need for improvement of fuel economy of motor vehicles. In particular, a system is expected that worms up a coolant, engine oil and an automatic transmission fluid (ATF: Automatic Transmission Fluid) at an early stage to reduce friction losses, in order to prevent deterioration of fuel economy at the time when an engine is cold, such as when the engine is started. Further, a system is expected that heats an exhaust gas purifying catalyst in order to activate the catalyst at an early stage.

Such systems include, for example, a heat exchanger. The heat exchanger is a device that exchanges heat between a first fluid and a second fluid by allowing the first fluid to flow inside and the second fluid to flow outside. In such a heat exchanger, for example, the heat can be effectively utilized by exchanging the heat from the first fluid having a higher temperature (for example, an exhaust gas) to the second fluid having a lower temperature (for example, cooling water).

Patent Literature 1 proposes a heat exchanger including: a heat collecting portion formed as a honeycomb structure having a plurality of cells through which a first fluid (for example, an exhaust gas) can flow; and a casing arranged to cover an outer peripheral surface of the heat collecting portion, through which a second fluid (for example, cooling water) can flow between the heat collecting portion and the casing. However, the heat exchanger of Patent Literature 1 has a structure in which waste heat from the first fluid to the second fluid is constantly collected. Therefore, even if there is no need to collect the waste heat, the waste heat might be collected. Therefore, the heat exchanger has been required to increase a capacity of a radiator for discharging the collected waste heat even if there has been no need to collect the waste heat.

Therefore, Patent Literature 2 proposes a heat exchanger including: an inner cylinder disposed such that a casing arranged so as to cover an outer peripheral surface of a honeycomb structure is fitted to an outer peripheral surface of the honeycomb structure; an intermediate cylinder disposes so as to cover the inner cylinder; an outer cylinder arranged so as to cover the intermediate cylinder, wherein an inner-side outer peripheral flow path is formed between the inner cylinder and the intermediate cylinder, and an outer-side outer peripheral flow path is formed between the intermediate cylinder and the outer cylinder. According to the heat exchanger, when a temperature of the inner cylinder is lower than a boiling point of a refrigerant (a second fluid) (when it is necessary to recover waste heat), the inner-side outer peripheral flow path and the outer-side outer peripheral flow path are filled with the refrigerant in the form of liquid, so that heat exchange can be promoted. Further, when a temperature of the inner cylinder is equal to or higher than the boiling point of the refrigerant (when it is not necessary to recover the waste heat), the gaseous refrigerant generated by boiling and vaporizing is present in the inner-side outer peripheral flow path, so that heat exchange can be suppressed. Therefore, the heat exchanger can perform switching between promotion and suppression of the heat exchange between the two types of fluids.

CITATION LIST

Patent Literatures

Patent Literature 1: Japanese Patent Application Publication No. 2012-037165 A
Patent Literature 2: WO 2016/185963 A1

SUMMARY OF THE INVENTION

The present invention relates to a flow path structure of a heat exchanger, comprising: an inner cylinder through which a first fluid can flow, the inner cylinder being configured to be capable of housing a heat recovery member;

an outer cylinder disposed so as to be spaced on a radially outer side of the inner cylinder such that a second fluid can flow between the outer cylinder and the inner cylinder; and an intermediate cylinder disposed between the inner cylinder and the outer cylinder, the intermediate cylinder partitioning a flow path for the second fluid into an inner flow path and an outer flow path, wherein the intermediate cylinder comprises communication holes that are communicated in a radial direction, the communication holes being provided in an axial direction of the intermediate cylinder.

The present invention also relates to a heat exchanger, comprising the above flow path structure of the heat exchanger.

DETAILED DESCRIPTION OF THE INVENTION

As a result of studies, the present inventors have found that in the heat exchanger of Patent Literature 2, abnormal noises may be generated during suppression of heat exchange. This would be due to a phenomenon called a water hammer (a vapor hammer). Specifically, during the suppression of heat exchange, a second fluid in a gaseous state is present in the inner-side outer peripheral flow path between the inner cylinder and the intermediate cylinder, but the second fluid in the gaseous state is rapidly condensed and liquefied as the second fluid in the gaseous state are introduced into the inner-side outer peripheral flow path. A space where the gaseous second fluid (vapor) has been present is temporarily in vacuum, and when the introduced liquid second fluid rushes toward the vacuum portion, it collides with the liquefied second fluid and abnormal noises are generated.

Therefore, Patent Literature 2 provides a communication hole in the intermediate cylinder and also arranges a mesh member having a mesh structure at a portion where the communication hole is formed, so that the second fluid in the liquid state is slowly introduced, and the abnormal noises are reduced.

However, simply arranging the mesh member having the mesh structure in the portion where the communication hole is formed may not be sufficient to reduce the generation of abnormal noises. Therefore, there has been a need for development of a novel technique to reduce the generation of abnormal noises.

The present invention has been made to solve the above problems. An object of the present invention is to provide a flow path structure of a heat exchanger, which can reduce abnormal noises during suppression of heat exchange, and a heat exchanger having the flow path structure.

As results of intensive studies to solve the above problems, the present inventors have found that a flow path structure of a heat exchanger having an intermediate cylinder between an inner cylinder and an outer cylinder, which partitions a flow path for a second fluid into an inner flow path and an outer flow path, is provided with a plurality of communication holes that are communicated in an axial direction of the intermediate cylinder, whereby previously separated second fluids (vapor) in a gaseous state are present during suppression of heat exchange, and a vapor mass (a volume of vapor to be condensed) which affects the magnitude of abnormal noises is decreased, so that the abnormal noises can be effectively reduced, and have completed the present invention.

A flow path structure of a heat exchanger of the present invention includes: an inner cylinder through which a first fluid can flow, the inner cylinder being configured to be capable of housing a heat recovery member; an outer cylinder disposed so as to be spaced on a radially outer side of the inner cylinder such that a second fluid can flow between the outer cylinder and the inner cylinder; and an intermediate cylinder disposed between the inner cylinder and the outer cylinder, the intermediate cylinder partitioning a flow path for the second fluid into an inner flow path and an outer flow path. The intermediate cylinder has communication holes that are communicated in a radial direction, and the communication holes are provided in an axial direction of the intermediate cylinder.

Further, a heat exchanger according to the present invention is a heat exchanger including the flow path structure of the heat exchanger as described above. According to the present invention, it is possible to provide a flow path structure of a heat exchanger, which can reduce abnormal noises during suppression of heat exchange, and a heat exchanger having the flow path structure.

Hereinafter, specific embodiments of the present invention will be described in detail with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention.

Embodiment 1

Figure 1:
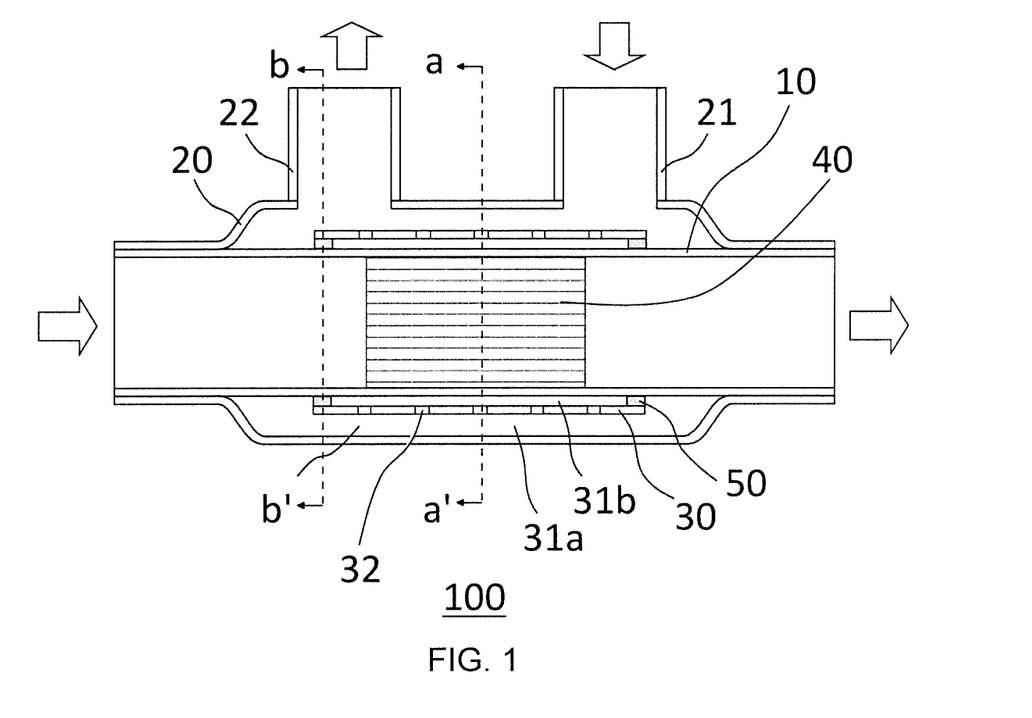
FIG. 1 is a cross-sectional view of a heat exchanger according to Embodiment 1 of the present invention, which is parallel to a flow direction of a first fluid.
Figure 2:
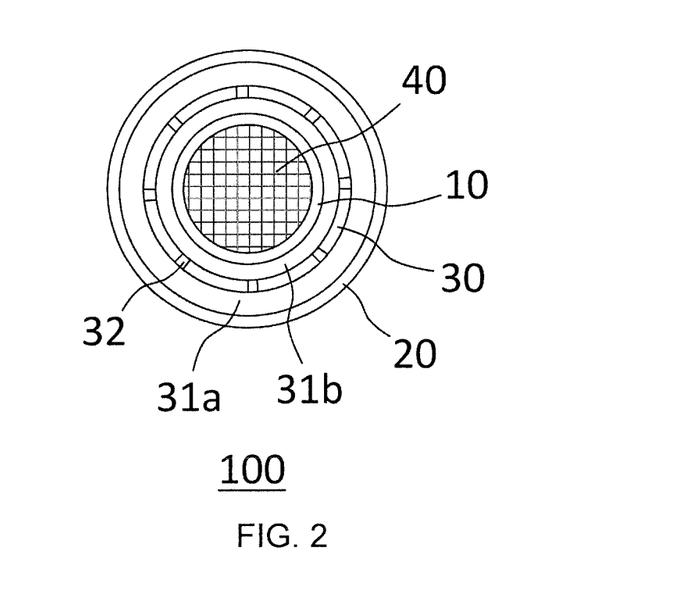
FIG. 2 is a cross-sectional view taken along the line a-a' in the heat exchanger of FIG. 1.
Figure 3:
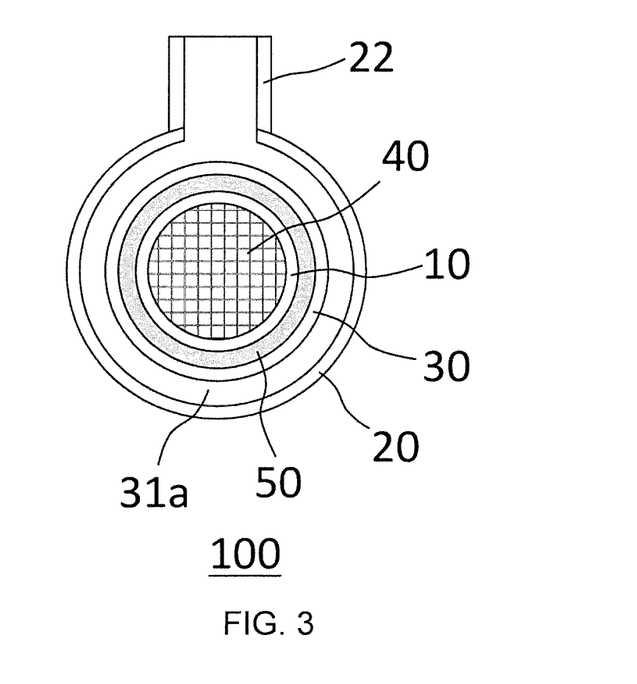
FIG. 3 is a cross-sectional view taken along the line b-b' in the heat exchanger of FIG. 1.
Figure 4A:
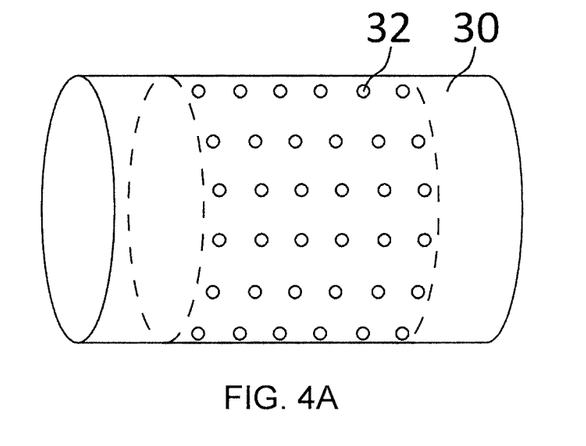
FIG. 4A-4F are perspective views showing examples of forming communication holes provided in an intermediate cylinder.
Figure 4B:
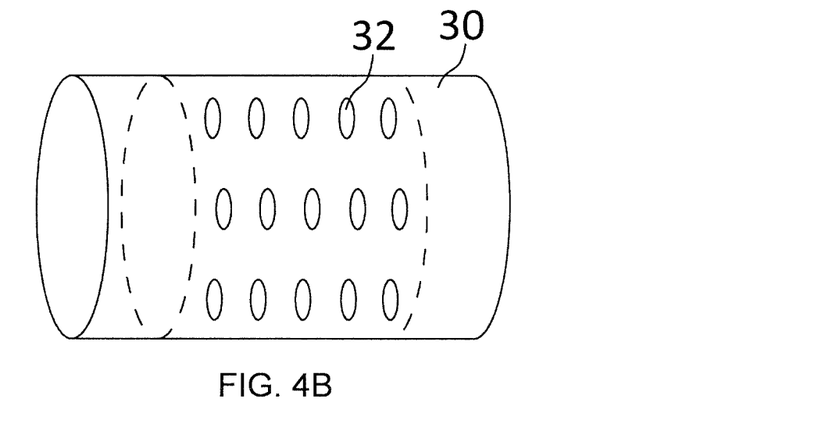
Figure 4C:
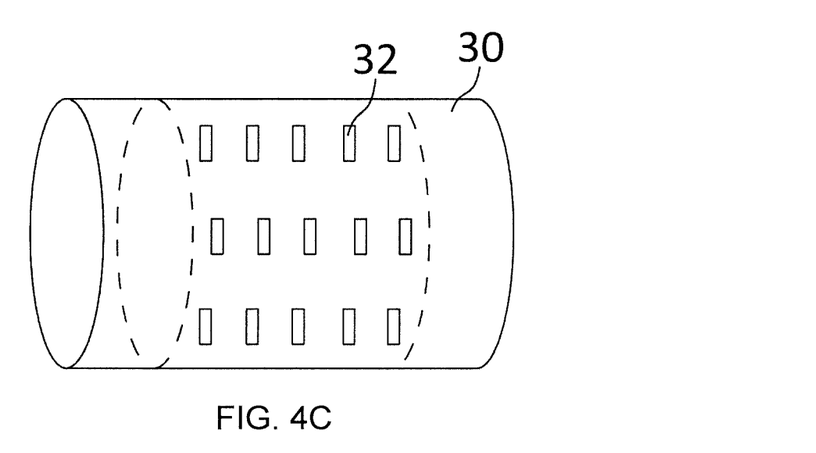
Figure 4D:
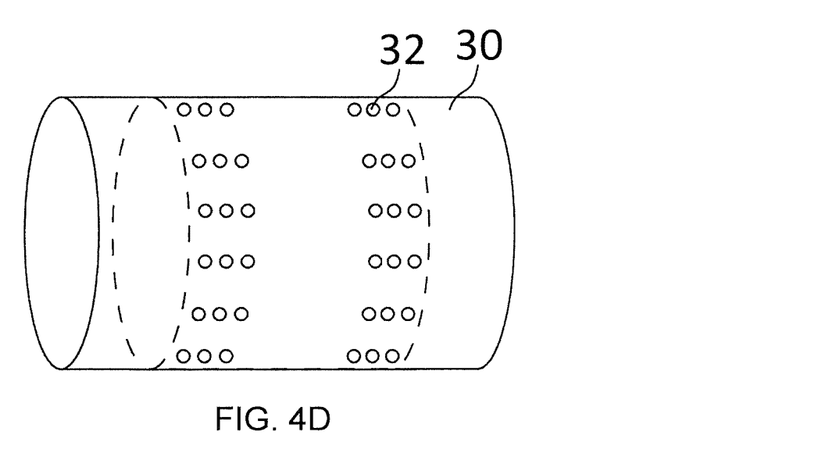
Figure 4E:
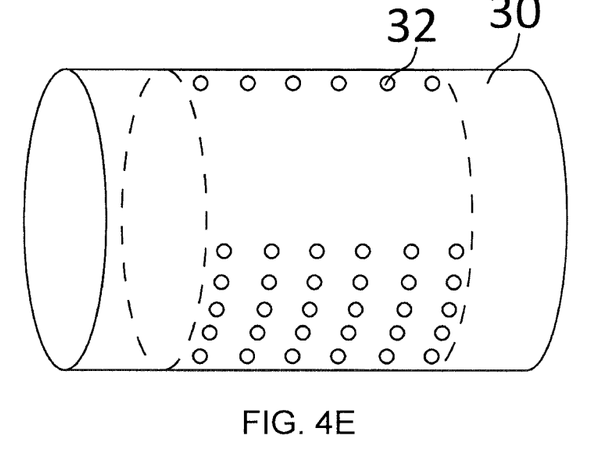
Figure 4F:
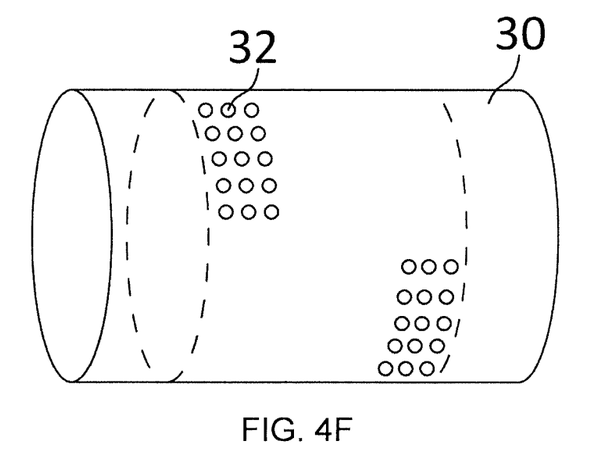

FIG. 1 is a cross-sectional view of a heat exchanger according to Embodiment 1 of the present invention, which is parallel to a flow direction of a first fluid. FIG. 2 is a cross-sectional view taken along the line a-a' in the heat exchanger of FIG. 1. FIG. 3 is a cross-sectional view taken along the line b-b' in the heat exchanger of FIG. 1. As shown in FIG. 1, a heat exchanger 100 according to Embodiment 1 of the present invention includes: an inner cylinder 10 through which a first fluid can flow and which is configured to be capable of hosing a heat recovery member 40; an outer cylinder 20 arranged to be spaced on a radially outer side of the inner cylinder 10, in which a second fluid can flow between the outer cylinder 20 and the inner cylinder 10; and an intermediate cylinder 30 disposed between the inner cylinder 10 and the outer cylinder 20, which partitions the fluid path for the second fluid. The intermediate cylinder 30 is also held on the inner cylinder 10 by spacers 50 provided at both axial ends of the intermediate cylinder 30.

Here, as the first fluid and the second fluid, various liquids and gases can be used. For example, when the heat exchanger 100 is mounted on a motor vehicle, an exhaust gas can be used as the first fluid, and water or antifreeze (LLC defined by JIS K2234: 2006) can be used as the second fluid. Further, the first fluid can be a fluid having a temperature higher than that of the second fluid.

During suppression of heat exchange, the second fluid in a gaseous state is present in an inner flow path 31$b$ between the inner cylinder 10 and the intermediate cylinder 30. At this time, as the second fluid in the liquid state is fed into the inner flow path 31$b$, the second fluid in the gaseous state is rapidly condensed and liquefied. In this case, a space where the gaseous second fluid (vapor) has been present is temporarily in vacuum. When the introduced second fluid in the liquid state rushes toward the vacuum portion, it collides with the liquefied second fluid to generate abnormal noises. The magnitude of the abnormal noises caused by such a water hammer is in relation to growth of a vapor mass (a volume of vapor to be condensed), and the smaller the vapor mass is, the smaller the abnormal noise is.

Therefore, in the heat exchanger 100 according to Embodiment 1 of the present invention, the intermediate cylinder 30 has communication holes 32 that are communicated in the radial direction, and the communication holes 32 are provided in the axial direction of the intermediate cylinder 30. Such a structure can allow previously separated gaseous second fluids (vapor) to be present within the inner flow path 31$b$ between the inner cylinder 10 and the intermediate cylinder 30 during suppression of heat exchange. Therefore, the vapor mass is decreased, so that abnormal noises caused by the water hammer can be reduced.

A shape of each communication hole 32 is not particularly limited as long as it allows the second fluid to pass therethrough, and may be, for example, various shapes such as a circular shape, an elliptical shape, and a polygonal shape. Further, a slit may be provided as each communication hole 32 along the axial direction or the circumferential direction of the intermediate cylinder 30.

The number of the communication holes 32 is not particularly limited as long as it is plural in the axial direction of the intermediate cylinder 30. In general, the number of the communication holes 32 may be set as needed, depending on the shape of each communication hole 32, and is not particularly limited.

In terms of stably reducing the vapor mass, the communication holes 32 are preferably formed to satisfy at least one of the following conditions (1) to (4):

(1) The communication holes 32 are provided in three or more rows in the axial direction of the intermediate cylinder 30.

(2) The communication holes 32 are provided in six rows or more in the circumferential direction of the intermediate cylinder 30.

(3) The communication hole 32 is provided at a central portion of the intermediate cylinder 30 in the axial direction.

(4) The communication holes 32 are provided at substantially equal intervals in both the axial direction and the circumferential direction of the intermediate cylinder 30. By satisfying one or more of the above conditions (1) to (4), the vapor mass is stably decreased, so that an effect of reducing abnormal noises caused by the water hammer can be improved.

Here, examples of forming of the communication holes 32 provided in the intermediate cylinder 30 are shown in FIGS. 4A-4F. FIGS. 4A-4F are perspective views of the inter cylinder 30. Further, in the perspective views, the dotted line portion means a portion corresponding to the location of the heat recovery member 40 in the axial direction of the intermediate cylinder 30.

Hereinafter, each member forming the heat exchanger 100 will be further described in detail for each member.

<Regarding Inner Cylinder 10>

The inner cylinder 10 is a cylindrical member disposed on an outer peripheral surface of the heat recovery member 40 in the axial direction (the flow direction of the first fluid). An inner peripheral surface of the inner cylinder 10 may be in direct or indirect contact with an axial outer peripheral surface of the heat recovery member 40. However, in terms of thermal conductivity, it is preferable that the inner peripheral surface of the inner cylinder is in direct contact with the axial outer peripheral surface of the heat recovery member 40. In this case, a cross-sectional shape of the inner peripheral surface of the inner cylinder 10 matches a cross-sectional shape of the outer peripheral surface of the heat recovery member 40. Also, it is preferable that the axial direction of the first inner cylinder 10 coincides with that of the heat recovery member 40, and a central axis of the inner cylinder 10 coincides with that of the heat recovery member 40. It is preferable that an axial length of the inner cylinder 10 is longer than that of the heat recovery member 40. In the axial direction of the inner cylinder 10, a center position of the inner cylinder 10 preferably matches that of the heat recovery member 40. Diameters (an outer diameter and an inner diameter) of the first inner cylinder 10 may be uniform in the axial direction, but the diameter of at least a part (for example, both ends in the axial direction or the like) of the inner cylinder may be reduced or expanded.

Since the heat of the first fluid passing through the heat recovery member 40 is transmitted to the inner cylinder 10 via the heat recovery member 40, the inner cylinder 10 is preferably formed of a material having good heat conductivity. Examples of a material used for the inner cylinder 10 include, metals, ceramics, and the like. Examples of the metals include stainless steel, titanium alloys, copper alloys, aluminum alloys, and brass. The material of the inner cylinder 10 is preferably stainless steel because of its higher durability and reliability.

<Regarding Outer Cylinder 20>

The outer cylinder 20 is a cylindrical member disposed so as to be spaced on a radially outer side of the inner cylinder 10.

It is preferable that an axial direction of the outer cylinder 20 coincides with that of each of the heat recovery member 40 and the inner cylinder 10, and a central axis of the outer cylinder 20 coincides with that of each of the heat recovery member 40 and the inner cylinder 10.

It is preferable that an axial length of the outer cylinder 20 is set to be longer than that of the heat recovery member 40. In the axial direction of the outer cylinder 20, a center position of the outer cylinder 20 preferably matches that of each of the heat recovery member 40 and the inner cylinder 10.

The outer cylinder 20 is connected to both a feed pipe 21 for feeding the second fluid to a region between the outer cylinder 20 and the inner cylinder 10, and a discharge pipe 22 for discharging the second fluid from the region between the outer cylinder 20 and the inner cylinder 10. The feed pipe 21 and the discharge pipe 22 are preferably provided at positions corresponding to both axial ends of the heat recovery member 40, respectively.

The feed pipe 21 and the discharge pipe 22 may extend in the same direction as shown in FIG. 1, or may extend in different directions.

Diameters (an outer diameter and an inner diameter) of the outer cylinder 20 may be uniform in the axial direction, but the diameter of at least a part (for example, a central portion in the axial direction, both ends in the axial direction, or the like) of the outer cylinder may be reduced or expanded. For example, by reducing the diameter of the central portion in the axial direction of the outer cylinder 20, the second fluid in the outer cylinder 20 on the feed pipe 21 and discharge pipe 22 sides can spread throughout the outer peripheral direction of the inner cylinder 10. Therefore, the second fluid that does not contribute to heat exchange is reduced at the axial center, so that the heat exchange efficiency can be improved.

The outer cylinder 20 can preferably be made of, for example, a metal or ceramics. Examples of metal include stainless steel, titanium alloys, copper alloys, aluminum alloys, brass and the like. Among them, the material of the outer cylinder 20 is preferably the stainless steel because it has high durability and reliability.

<Regarding Intermediate Cylinder 30>

The intermediate cylinder 30 is a cylindrical member. It is preferable that an axial direction of the intermediate cylinder 30 coincides with that of the heat recovery member 40, and a center axis of the intermediate cylinder 30 coincides with that of the heat recovery member 40.

It is preferable that an axial length of the intermediate cylinder 30 is longer than that of the heat recovery member 40. In the axial direction of the intermediate cylinder 30, the central position of the intermediate cylinder 30 preferably coincides with that of each of the heat recovery member 40, the inner cylinder 10, and the outer cylinder 20.

The providing of the intermediate cylinder 30 that partitions the flow path for the second fluid between the inner cylinder 10 and the outer cylinder 20 leads to formation of both an outer flow path 31a for the second fluid formed between the outer cylinder 20 and the intermediate cylinder 30, and an inner flow path 31b for the second fluid formed between the inner cylinder 10 and the intermediate cylinder 30.

When the inner flow path 31b is filled with the liquid second fluid, the heat of the first fluid transmitted from the heat recovery member 40 to the inner cylinder 10 is transmitted to the second fluid in the outer flow path 31a via the second fluid in the inner flow path 31b. On the other hand, when a temperature of the inner cylinder 10 is higher and vapor (bubbles) of the second fluid is generated in the inner flow path 31b, the thermal conduction of the second fluid in the outer flow path 31a via the second fluid in the inner flow path 61b is suppressed. This is because thermal conductivity of a gaseous fluid is lower than that of a liquid fluid. That is, a state where heat exchange is efficiently performed and a state where heat exchange is suppressed can be switched depending on whether or not the second fluid in the gaseous state is generated in the inner flow path 31b. The states of heat exchange do not require any external control. Therefore, the providing of the intermediate cylinder 30 can allow for easy switching between promotion and suppression of heat exchange between the first fluid and the second fluid without external control.

It should be noted that the second fluid may be a fluid having a boiling point in a temperature range in which heat exchange is to be suppressed.

<Regarding Spacer 50>

Each spacer 50 is a member for securing and holding a space between the intermediate cylinder 30 and the inner cylinder 10, and is provided between the intermediate cylinder 30 and the inner cylinder 10.

It is preferable that each spacer 50 extends over the entire circumferential direction of the inner cylinder 10. The spacer 50 may be formed by one member continuously extending over the entire circumferential direction of the inner cylinder 10, or may be formed by a plurality of members arranged adjacent to or separated from each other in the circumferential direction of the inner cylinder 10.

The spacers 50 are preferably arranged at positions on two axial end faces sides of the heat recovery member 40, respectively, and are more preferably arranged at positions outside the two axial end faces of the heat recovery member 40, respectively. By arranging the spacers 50 at such positions, the heat of the heat recovery member 40 can be difficult to be transmitted to the intermediate cylinder 30 via the spacers 50. If the heat of the heat recovery member 40 is transmitted to the intermediate cylinder 30 via the spacers 50, the effect of suppressing the heat exchange by the gaseous second fluid will be reduced.

Each spacer 50 is not particularly limited as long as it has the function as stated above. Preferably, each spacer 50 has a three-dimensional structure that allows passage of the liquid second fluid and also inhibits passage of the gaseous second fluid. Examples of such a three-dimensional structure include a mesh structure (a network structure) and a sponge-like structure (a porous structure). The spacer 50 "allows passage of the liquid second fluid" means that the second fluid in the liquid state can pass through the spacer 50, and the spacer 50 may be a resistance to the passage of the second fluid in the liquid state. The spacer 50 "inhibits passage of the gaseous second fluid" includes adhering of the second fluid in the gaseous state to the spacer 50 and resistance of the spacer 50 to the movement of the second fluid in the gaseous state. It is preferable that the spacer 50 has the mesh structure because it easily achieves both allowance of passage of the liquid second fluid and inhibition of passage of the gaseous second fluid.

When a major part of the interior of the inner flow path 31b is filled with the gaseous second fluid, the flowing of a large amount of the second fluid in the inner flow path 31b rapidly generate abnormal noises due to the water hummer phenomenon, causing vibration and noise. The spacer 50 has resistance to the passage of the liquid second fluid, so that the flow of the second fluid into the inner flow path 31b becomes gentle, and the generation of abnormal noises can be further suppressed.

The spacer 50 inhibits the passage of the gaseous second fluid, whereby the gaseous second fluid accumulates in the inner flow path 31b, and the suppression of heat exchange by the gaseous second fluid is more reliably exerted. In order to more reliably exert the suppression of the heat exchange, the spacer 50 preferably has a porosity of 20% or more, and more preferably 40% or more, and even more preferably 60% or more. Further, the porosity of the spacer 50 is preferably 98% or less, and more preferably 95% or less, and further preferably 90% or less. In the present invention, the porosity of the spacer 50 is measured by the following procedure:

1) True density of the material forming the spacer 50 is determined by the Archimedes method.

2) Bulk density is determined from an apparent volume of the spacer 50 calculated from the outer dimensions (thickness and vertically and horizontally lengths) of the spacer 50 and from the weight of the spacer 50.

3) The porosity is calculated by using the relational expression: porosity=(1—bulk density/true density)×100%.

The spacers 50 are preferably configured such that the spacer 50 provided at one end portion in the axial direction of the intermediate cylinder 30 is fixed to both the intermediate cylinder 30 and the inner cylinder 10, and the spacer 50 provided at the other end portion in the axial direction of the intermediate cylinder 30 is fixed to the inner cylinder 10 and movable to the intermediate cylinder 30. In addition, although the fixing method is not particularly limited, welding and the like can be used.

When the spacers 50 at both ends in the axial direction are fixed to both the intermediate cylinder 30 and the inner cylinder 10, respectively, the following events may occur. That is, when the gaseous second fluid is generated in the inner flow path 31b and heat exchange between the second fluid in the inner flow path 31b and the second fluid in the outer flow path 31a is suppressed, a temperature difference is generated between the inner cylinder 10 and the intermediate cylinder 30. At this time, the inner cylinder 10 is heated by the heat of the first fluid, while the intermediate cylinder 30 is cooled by the second fluid in the outer flow path 31a, so that the inner cylinder 10 expands rather than the intermediate cylinder 30. When the spacers 50 at both ends in the axial direction are fixed to both the intermediate cylinder 30 and the inner cylinder 10, respectively, the fixed portions at both ends in the axial direction are damaged by stress due to a difference between expansions of the intermediate cylinder 30 and the inner cylinder 10, thereby shifting the positional relationship between the intermediate cylinder 30 and the inner cylinder 10 to lose the inner flow path 31b.

As described above, the spacer 50 provided at one axial end of the intermediate cylinder 30 is fixed to both the intermediate cylinder 30 and the inner cylinder 10, while the spacer 50 provided at the other axial end of the intermediate cylinder 30 is fixed to the inner cylinder 10 and is movable (non-fixed) to the intermediate cylinder 30, whereby, when the inner cylinder 10 expands, the intermediate cylinder 30 slides on the spacer 50 at the non-fixed position. This can avoid damaging the fixed portion of the spacer 50 by the stress due to the difference between the expansions of the intermediate cylinder 30 and the inner cylinder 10 to shift the positional relationship between the intermediate cylinder 30 and the inner cylinder 10 to lose the inner flow path 31b.

<Regarding Heat recovery member 40>

The heat recovery member 40 is not particularly limited as long as it can recover heat. For example, a honeycomb structure can be used as the heat recovery member 40. The honeycomb structure is generally a pillar shaped structure. A cross-sectional shape perpendicular to the axial direction of the honeycomb structure is not particularly limited, and it may be a circle, an ellipse, a quadrangle, or other polygons.

The honeycomb structure has a plurality of cells separated from each other by partition walls and an outer peripheral wall which are mainly based on ceramics. Each cell passes through the interior of the honeycomb structure from a first end face to a second end face of the honeycomb structure. The first end face and the second end face are end faces on both sides of the honeycomb structure in the axial direction (a cell extending direction).

Each cell may have any cross-sectional shape (a shape of a cross section perpendicular to the cell extending direction), including, but not particularly limited to, circular, elliptical, triangular, quadrangular, hexagonal and other polygonal shapes. Also, the cells may be radially formed in a cross section in a direction perpendicular to the cell extending direction. Such a structure can allow heat of the first fluid flowing through the cells to be efficiently transmitted to the outside of the honeycomb structure.

The outer peripheral wall preferably has a thickness larger than that of the partition wall. Such a structure can lead to increased strength of the outer peripheral wall which would otherwise tend to generate breakage (e.g., cracking, chinking, and the like) by thermal stress or the like due to a difference between temperatures of the first fluid and the second fluid.

A thickness of each partition wall is not particularly limited, and it may be adjusted as needed depending on applications. For example, the thickness of each partition wall may preferably be from 0.1 to 1 mm, and more preferably from 0.2 to 0.6 mm. The thickness of the partition wall of 0.1 mm or more can provide the honeycomb structure with a sufficient mechanical strength. Further, the thickness of the partition wall of 1 mm or less can suppress problems that the pressure loss is increased due to a decrease in an opening area and the heat recovery efficiency is decreased due to a decrease in a contact area with the first fluid.

A method for producing the heat exchanger 100 will be now described. The heat exchanger 100 can be produced in accordance with a method known in the art. For example, when using the honeycomb structure as the heat recovery member 40, the heat exchanger 100 can be produced as described below.

First, a green body containing ceramic powder is extruded into a desired shape to prepare a honeycomb formed body. The material of the honeycomb formed body is not particularly limited, and a known material can be used. For example, when producing a honeycomb formed body containing a Si-impregnated SiC composite as a main component, a binder and water or an organic solvent are added to a predetermined amount of SiC powder, and the resulting mixture is kneaded to form a green body, which can be then formed into a honeycomb formed body having a desired shape. The resulting honeycomb formed body can be then dried, and the dried honeycomb formed body can be impregnated with metallic Si and fired in an inert gas under reduced pressure or in vacuum to obtain a honeycomb structure having cells serving as flow paths for the first fluid, defined by the partition walls.

The honeycomb structure is then inserted into the inner cylinder 10, and the inner cylinder 10 is arranged so as to be fitted to the honeycomb structure by shrink fitting. Alternatively, the honeycomb structure and the inner cylinder 10 may be fitted by press fitting, brazing, diffusion bonding, or the like, instead of the shrink fitting.

The intermediate cylinder 30 is then arranged on the inner cylinder 10 via the spacers 50. The space between each spacer 50 and the inner cylinder 10 and the space between each spacer 50 and the intermediate cylinder 30 are fixed by welding or the like.

The structure produced above is then disposed inside the outer cylinder 20 provided with the feed pipe 21 and the discharge pipe 22 for the second fluid, and fixed by welding or the like.

According to the heat exchanger 100 and the flow path structure thereof according to Embodiment 1 of the present invention, the previously separated gaseous second fluids (vapor) in the inner flow path 31b between the inner cylinder 10 and the intermediate cylinder 30 can be present during suppression of heat exchange. Therefore, the vapor mass can be reduced, so that abnormal noises can be reduced.

Embodiment 2

Figure 5:
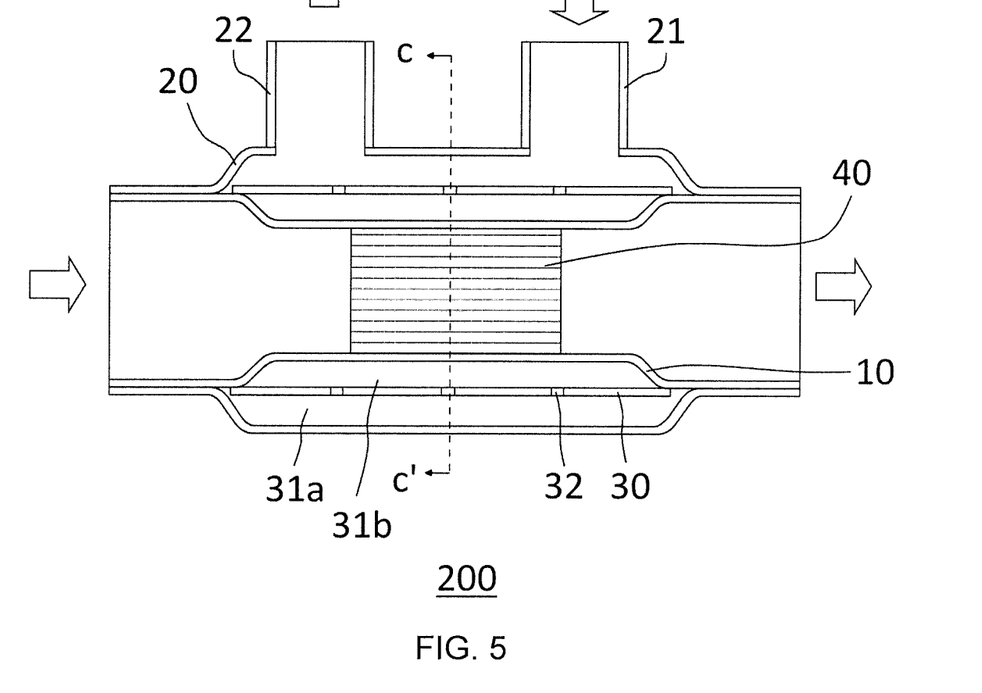
FIG. 5 is a cross-sectional view of a heat exchanger according to Embodiment 2 of the present invention, which is parallel to a flow direction of a first fluid.
Figure 6:
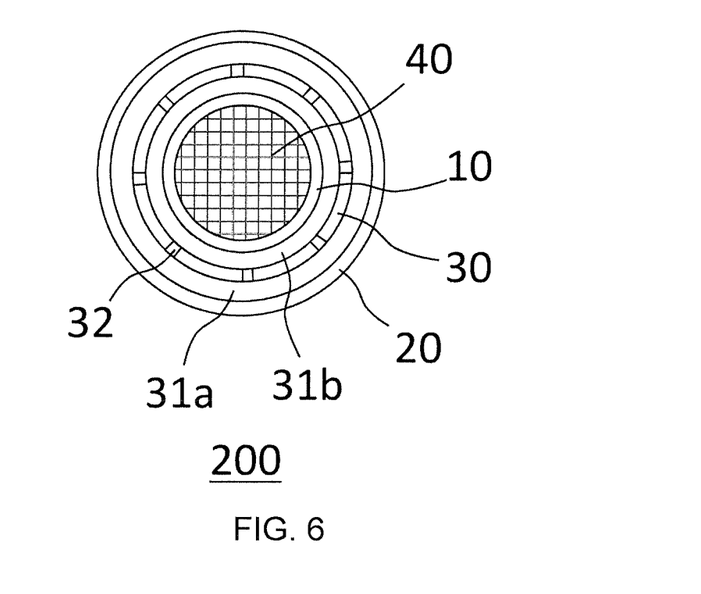
FIG. 6 is a cross-sectional view taken along the line c-c' in the heat exchanger of FIG. 5.

FIG. 5 is a cross-sectional view of a heat exchanger according to Embodiment 2 of the present invention, which is parallel to the flow direction of the first fluid. Further, FIG. 6 is a cross-sectional view taken along the line c-c' in the heat exchanger of FIG. 5. The members having the same reference numerals as those appearing in the descriptions of the heat exchanger 100 according to Embodiment 1 of the present invention are the same as those of a heat exchanger 200 according to Embodiment 2 of the present invention. Therefore, the descriptions thereof are omitted.

The heat exchanger 100 according to Embodiment 1 of the present invention and the heat exchanger 200 according to Embodiment 2 of the present invention are different from each other in that, in the former, the intermediate cylinder 30 is held in the inner cylinder 10 by the spacers 50 provided at both ends in the axial direction of the intermediate cylinder 30, whereas, in the latter, both axial ends of the intermediate cylinder 30 are connected to the inner cylinder 10 having an increased diameter. Such a structure can allow the inner flow path 31b through which the second fluid can flow to be ensured between the intermediate cylinder 30 and the inner cylinder 10, and can allow the manufacturing costs to be reduced because the spacers 50 are not required. A method of connecting the intermediate cylinder 30 to the inner cylinder 10 is not particularly limited, and welding or the like can be used.

Further, it is preferable that one end in the axial direction of the intermediate cylinder 30 is fixed to the inner cylinder 10 having the increased diameter, and the other end in the axial direction of the intermediate cylinder 30 is provided so as to be movable to the inner cylinder 10 having the increased diameter. According to such a configuration, when the inner cylinder 10 expands, the intermediate cylinder 30 slides on the inner cylinder 10 at the non-fixed position. Therefore, it can avoid deforming the inner cylinder 10 by stress due to the difference between expansions of the intermediate cylinder 30 and the inner cylinder 10 to shift the positional relationship between the intermediate cylinder 30 and the inner cylinder 10 to lose the inner flow path 31b.

The heat exchanger 200 having the above structure can be produced according to a method known in the art. For example, the heat exchanger 200 can be produced as follows:

First, the honeycomb structure is inserted into the inner cylinder 10, and the inner cylinder 10 is arranged so as to be fitted to the honeycomb structure by shrink fitting. Alternatively, the honeycomb structure and the inner cylinder 10 may be fitted by press-fitting, brazing, diffusion bonding, or the like, instead of the shrink fitting. The inner cylinder 10 containing the honeycomb structure is then inserted into the intermediate cylinder 30 and fixed by welding or the like.

The structure produced above is then disposed inside the outer cylinder 20 provided with the feed pipe 21 and the discharge pipe 22 for the second fluid, and fixed by welding or the like.

Embodiment 3

Figure 7:
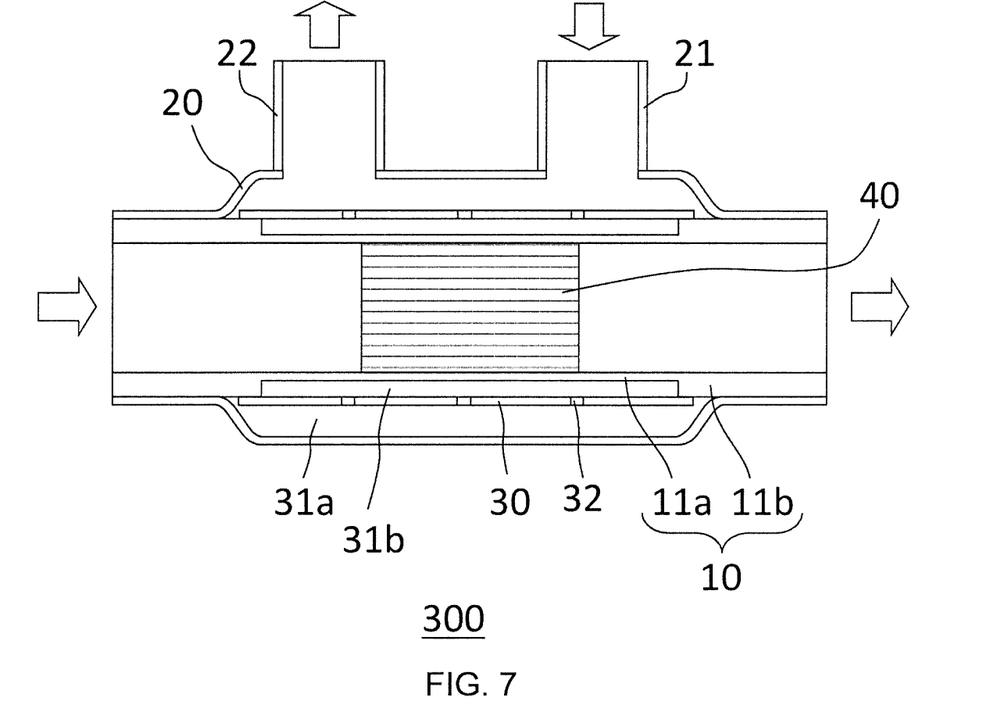
FIG. 7 is a cross-sectional view of a heat exchanger according to Embodiment 3 of the present invention, which is parallel to a flow direction of a first fluid.

FIG. 7 is a cross-sectional view of a heat exchanger according to Embodiment 3 of the present invention, which is parallel to the flow direction of the first fluid. The members having the same reference numerals as those appearing in the descriptions of the heat exchangers 100, 200 according to Embodiments 1 and 2 of the present invention are the same as those of a heat exchanger 300 according to Embodiment 3 of the present invention. Therefore, the descriptions thereof are omitted.

The heat exchangers 100, 200 according to Embodiments 1 and 2 of the present invention have substantially the same thickness of the inner cylinder 10, whereas the heat exchanger 300 according to Embodiment 3 of the present invention has different thicknesses of the inner cylinder 10. Specifically, the inner cylinder 10 has a portion A (11a) where a radially outer side is in contact with the inner flow path 31b and a portion B (11b) where a radially outer side is in contact with the outer flow path, and the thickness of the portion A (11a) is lower than that of the portion B (11b). The both ends of the intermediate cylinder 30 in the axial direction are connected to the portion B (11b) of the inner cylinder 10. Such a structure can allow the inner flow path 31b through which the second fluid can flow to be ensured between the intermediate cylinder 30 and the inner cylinder 10, and also can allow the manufacturing costs to be reduced because the spacers 50 are not required. The method of connecting the intermediate cylinder 30 to the portion B of the inner cylinder 10 is not particularly limited. Welding or the like may be used.

The heat exchanger 300 having the above structure can be produced according to a method known in the art. The method of processing the inner cylinder 10 having the portion A (11a) and the portion B (11b) is not particularly limited. For example, it may be carried out by preparing the inner cylinder 10 having the thickness of the portion B (11b) as a whole, and cutting out a surface at a portion that should form the portion A (11a) by a known method such as spot facing processing. The heat exchanger 300 can be then produced by the same procedure as that of Embodiment 2 of the present invention.

EXAMPLES

Hereinafter, the present invention will be more specifically described with reference to Examples, but the present invention is not limited to these Examples.

Example 1

In Example 1, a heat exchanger as shown in FIG. 1 was produced.

First, a green body containing SiC powder was extruded into a desired shape, then dried and processed to have predetermined external dimensions, and then impregnated with Si and fired to produce a circular pillar shaped honeycomb structure.

The honeycomb structure was then inserted into the inner cylinder 10 made of stainless steel, and the inner cylinder 10 was arranged so as to be fitted to the outer peripheral surface of the honeycomb structure by shrink fitting. The inner cylinder 30 was then arranged on the inner cylinder 10 via the spacers 50 each having a mesh structure, and was fixed by welding. As the intermediate cylinder 30, an intermediate cylinder 30 having a plurality of communication holes 32 shown in FIG. 4A was used (communication holes 32 having six rows in the axial direction of the intermediate cylinder 30 and ten rows in the circumferential direction of the intermediate cylinder 30 were provided at uniform intervals). The heat exchanger was then obtained by arranging the structure produced above inside the outer cylinder 20 provided with the feed pipe 21 and the discharge pipe 22 for the second fluid and fixing them by welding or the like.

Example 2

A heat exchanger was obtained in the same method and under the same conditions as those of Example 1, with the exception that the intermediate cylinder 30 provided with communication holes 32 having two rows of at the central portion in the axial direction of the intermediate cylinder 30 and ten rows in the circumferential direction of the intermediate cylinder 30 at uniform intervals.

Comparative Example 1

A heat exchanger was obtained in the same method and under the same conditions as those of Example 1, with the exception that the intermediate cylinder 30 having no communication hole 32 was used as the intermediate cylinder 30.

The following evaluation was carried out for the heat exchangers obtained above.

(Abnormal Noise)

Abnormal noises during suppression of heat exchange were verified by the following method:

Air was used as the first fluid and water was used as the second fluid. Heated air at 700° C. was fed at a flow rate of 20 g/sec to the honeycomb structure, and water was fed at a flow rate of 10 L/min between the inner cylinder 10 and the outer cylinder 20. Verification of abnormal noises at a water temperature of 30 to 93° C. was carried out. The magnitude of noises was measured using a noise level meter (NL-05 from RION Co., Ltd.). The noise level meter was disposed at an axial center of the outer cylinder 20 and on a radially outer side of the outer cylinder 20 with an interval of 45 mm. Results are shown in FIG. 8.

Figure 8:
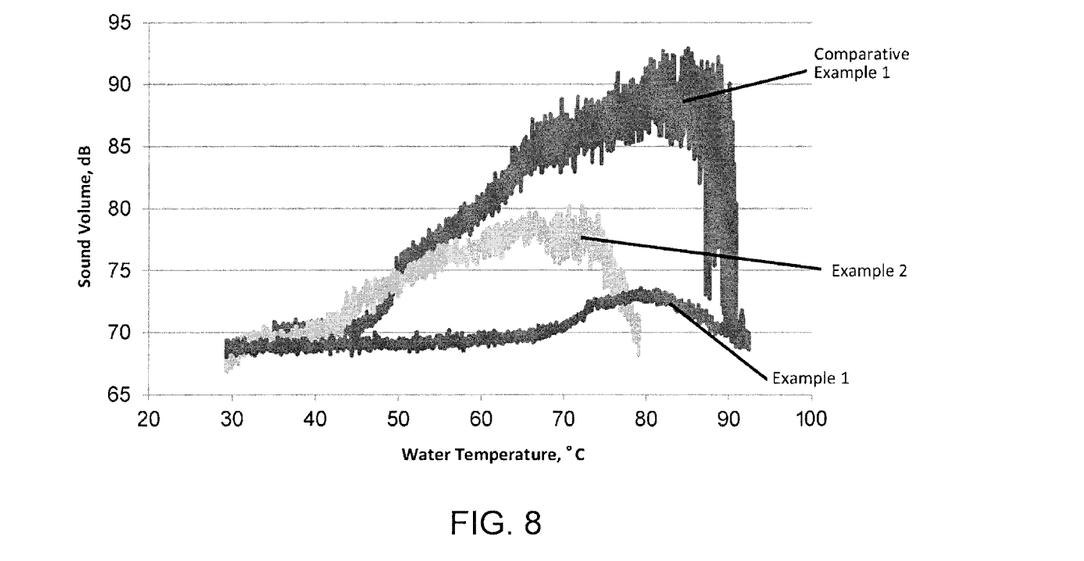
FIG. 8 is a graph showing a verification result of abnormal noises during suppression of heat exchange.

As shown in FIG. 8, the heat exchangers of Examples 1 and 2 in which the plurality of communication holes 32 were provided in the intermediate cylinder 30 had decreased noises as compared with the heat exchanger of Comparative Example 1 in which the plurality of communication holes 32 are not provided in the intermediate cylinder 30.

(Heat Recovery Efficiency)

A heat exchange test was carried out by the following method:

Air was used as the first fluid and water was used as the second fluid. Air at 400° C. (Tg1) was fed at a flow rate of 10 g/sec (Mg) to the inner cylinder 10, and water was fed at a flow rate of 10 L/min between the inner cylinder 10 and the outer cylinder 20 through the feed pipe 21, and water after heat exchange was recovered from the discharge pipe 22. Immediately after passing air and water through the heat exchanger for 5 minutes from the start of feeding under the above conditions, a temperature (Tw1) of water in the feed pipe 21 and a temperature (Tw2) of water in the discharge pipe 22 were measured to obtain a heat recovery efficiency. Here, a heat quantity Q recovered by water is expressed by the following equation:

$$Q(kW) = \Delta Tw \times Cpw \times Mw, \text{ with:}$$

$$\Delta Tw = Tw2 - Tw1, \text{ and } Cpw(\text{specific heat of water}) = 4182 \, J/(kg \cdot K).$$

Also, the heat recovery efficiency n of the heat exchanger is expressed by the following equation:

$$(\%) = Q/\{(Tg1 - Tw1) \times Cpg \times Mg\} \times 100, \text{ with:}$$

Cpg (specific heat of air)=1050 J/(kg·K).

Figure 9:
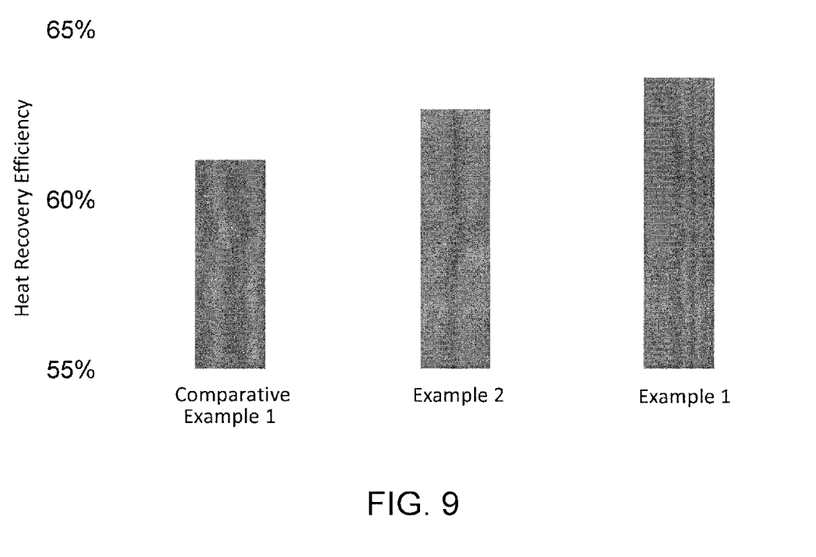
FIG. 9 is a graph showing results of heat recovery efficiency.

Results of the heat recovery efficiency are shown in FIG. 9.

As shown in FIG. 9, the heat exchangers of Examples 1 and 2 in which the intermediate cylinder 30 was provided with the plurality of communication holes 32 had a higher heat recovery rate than that of the heat exchanger of Comparative Example 1 in which the intermediate cylinder 30 was not provided with the plurality of communication holes 32.

As can be seen from the above results, according to the present invention, it is possible to provide a flow path structure of a heat exchanger, which can reduce abnormal noises during suppression of heat exchange, and a heat exchanger having the flow path structure.

DESCRIPTION OF REFERENCE NUMERALS 10 inner cylinder
11a portion A
11b portion B
20 outer cylinder
21 feed pipe
22 discharge pipe
30 intermediate cylinder
31a outer flow path
31b inner flow path
32 communication hole
40 heat recovery member
50 spacer
100, 200, 300 heat exchanger

What is claimed is:

1. A flow path structure of a heat exchanger comprising:
an inner cylinder through which a first fluid can flow, the inner cylinder being configured to be capable of housing a heat recovery member;
an outer cylinder disposed so as to be spaced on a radially outer side of the inner cylinder such that a second fluid can flow between the outer cylinder and the inner cylinder; and
an intermediate cylinder disposed between the inner cylinder and the outer cylinder, the intermediate cylinder partitioning a flow path for the second fluid into an inner flow path and an outer flow path,
wherein the intermediate cylinder comprises communication holes that are communicated in a radial direction, the communication holes being provided in an axial direction of the intermediate cylinder, and
wherein the inner cylinder has:
a portion A where a radially outer side faces the inner flow path; and
a portion B where a radially outer side faces the outer flow path, and
wherein a thickness of the inner cylinder at the portion A is lower than that of the inner cylinder at the portion B.

2. The flow path structure of the heat exchanger according to claim 1, wherein both ends of the intermediate cylinder in the axial direction are connected to the inner cylinder.

3. The flow path structure of the heat exchanger according to claim 1, wherein the both ends of the intermediate cylinder in the axial direction are connected to the portion B of the inner cylinder.

4. The flow path structure of the heat exchanger according to claim 1, wherein the communication holes are arranged in three or more rows in the axial direction of the intermediate cylinder.

5. The flow path structure of the heat exchanger according to claim 1, wherein the communication holes are arranged in six rows or more in a circumferential direction of the intermediate cylinder.

6. The flow path structure of the heat exchanger according to claim 1, wherein the communication holes are provided at a central portion in the axial direction of the intermediate cylinder.

7. The flow path structure of the heat exchanger according to claim 1, wherein the communication holes are provided at substantially equal intervals in both the axial direction and the circumferential direction of the intermediate cylinder.

8. A heat exchanger, comprising the flow path structure of the heat exchanger according to claim 1.

9. The heat exchanger according to claim 8,
wherein the heat exchanger further comprises the heat recovery member; and
wherein the heat recovery member is a honeycomb structure comprising partition walls, the partition walls defining a plurality of cells each extending from a first end face to a second end face.

10. The heat exchanger according to claim 9, wherein the intermediate cylinder has a higher length in an axial direction than that of the honeycomb structure.

* * * * *